March 12, 1940. J. GATTONI 2,192,905

PRECISION BALANCE

Filed Feb. 8, 1938 4 Sheets-Sheet 1

INVENTOR
JOHN GATTONI
BY Sager & Malcolm
ATTORNEYS

March 12, 1940. J. GATTONI 2,192,905
PRECISION BALANCE
Filed Feb. 8, 1938 4 Sheets-Sheet 2
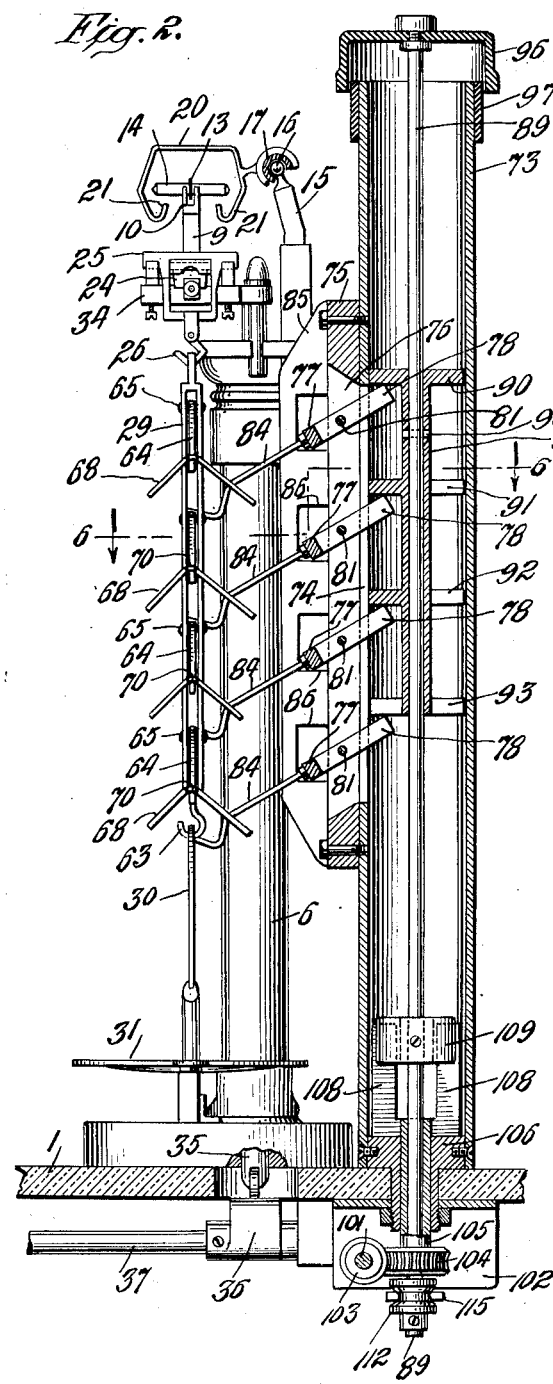
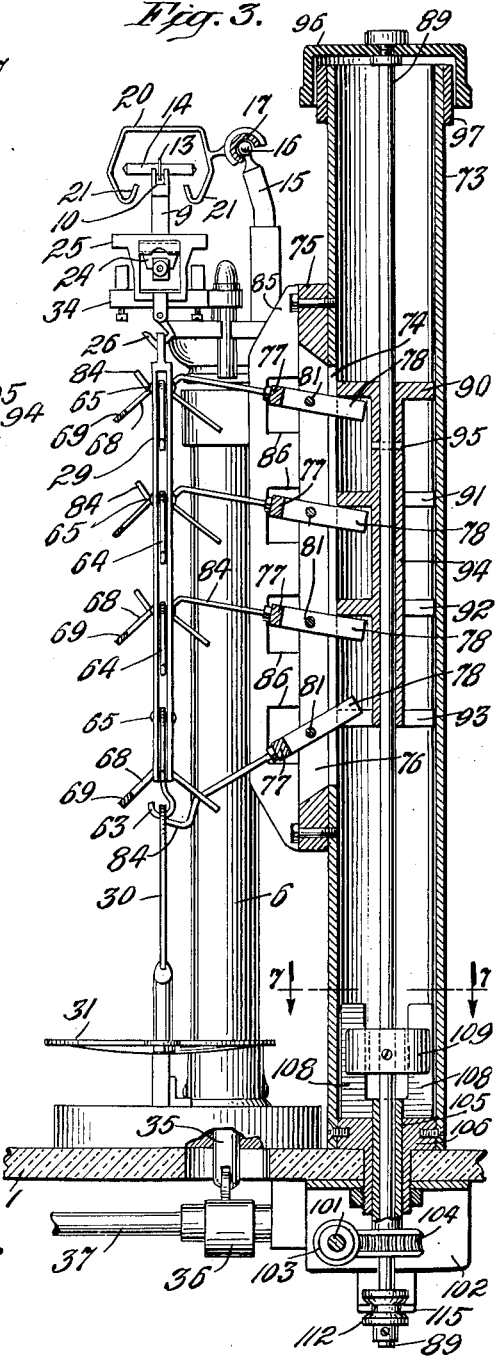
INVENTOR
JOHN GATTONI
BY Sager & Malcolm
ATTORNEYS

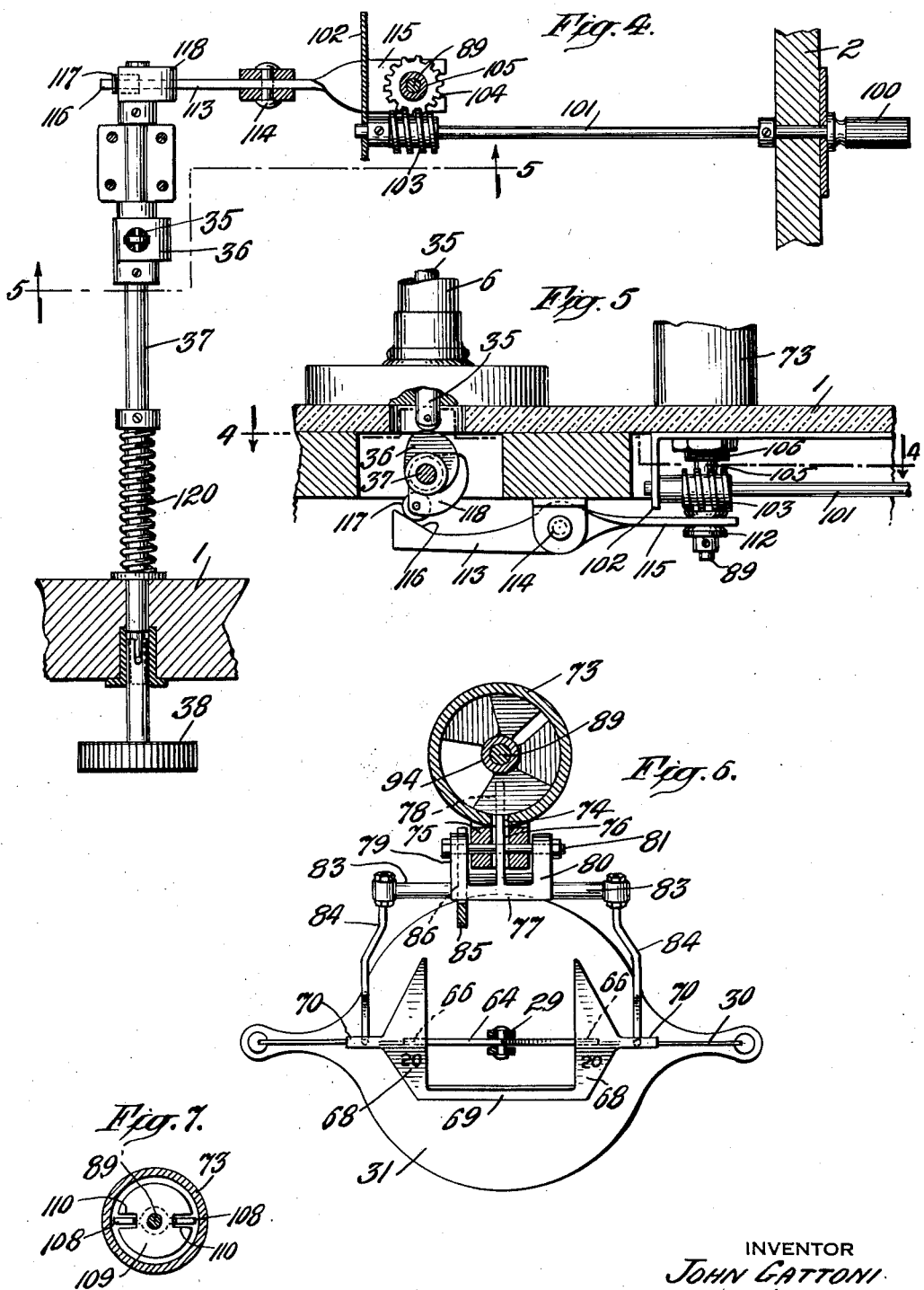

March 12, 1940. J. GATTONI 2,192,905
PRECISION BALANCE
Filed Feb. 8, 1938 4 Sheets-Sheet 4
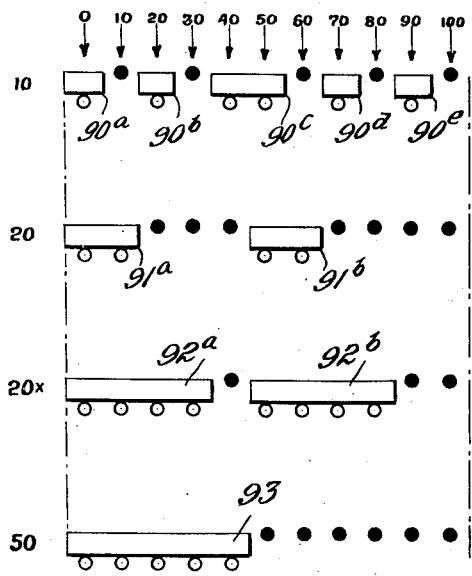
Fig. 8.
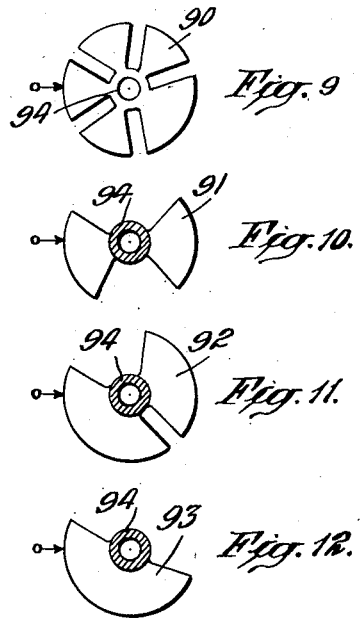
Fig. 9.
Fig. 10.
Fig. 11.
Fig. 12.
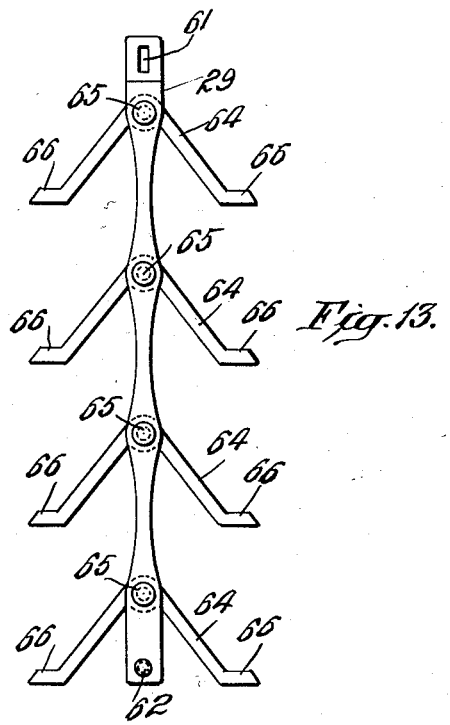
Fig. 13.
INVENTOR
JOHN GATTONI
BY Sager & Malcolm
ATTORNEYS Patented Mar. 12, 1940

2,192,905

UNITED STATES PATENT OFFICE 2,192,905

PRECISION BALANCE

John Gattoni, Union City, N. J., assignor to Seederer-Kohlbusch, Inc., Jersey City, N. J., a corporation of New Jersey Application February 8, 1938, Serial No. 189,314

9 Claims. (Cl. 265—54)

This invention relates to balances and has for its object to provide an improved precision balance for quickly and accurately weighing objects of relatively small mass.

Another object of the invention is to provide a balance of the above type in which weighing can be accomplished easily, quickly and accurately, and in which a wider variety of weight combinations can be obtained with fewer parts and adjustments than heretofore.

The invention is particularly applicable to sensitive balances of the type employed by analysts, chemists, jewelers, etc. As is well known, balances of this type include a beam which is delicately balanced on a knife edge and carries a pan or a plurality of pans for supporting the substance to be weighed as well as a set of known weights which are used in the weighing operation. These balances customarily employ movable poises on the beam, or adjustable chains, etc., suspended from the beam for weighing purposes.

My invention resides in the provision of a weight support or hanger which may be suspended from a balance beam and which is adapted to support a plurality of weights of either the same or different known values, and in the provision of means for lifting these weights off or placing them on the support in any desired combination in accordance with the nature of the substance to be weighed. Any desired number or combination of weights may be pivotally suspended from a common point on the beam in this manner, and all may be controlled by the manipulation of a single shaft or other control means operated from outside the balance case.

In one form of the invention, disclosed herein for purposes of illustration, a weighing pan of the conventional type is suspended from one end of the balance beam while a skeleton weight support or rack is pivotally suspended from the other end of the beam, and, when desired, a second weighing pan with an appropriately short bow may be suspended from the lower end of the skeleton rack; the rack alone, or the rack plus the short-bow pan when used, being of such weight as to exactly balance the conventional scale pan on the other end of the beam so as to cause the beam to rest in a state of equilibrium when the balance is empty.

In the above mentioned embodiment of the invention the weight rack suspended from one end of the beam consists of a skeleton frame or bar having a vertical series of weight supports pivoted thereto, and each of these weight supports is adapted to receive one of a series of weights which are normally carried by individual arms mounted on a standard which is conveniently located adjacent the skeleton rack. A common control is provided for all of the weight-lifting arms and is adapted to be operated from outside the balance case in such a way that the arms may be raised and lowered either individually or in any desired combination so as to deposit their respective weights on the rack or lift them off the rack as required.

The balance which I have chosen to illustrate the foregoing embodiment of the invention is a jeweler's balance and it is therefore calibrated in carats. To enable such a balance to weigh accurately up to 100 carats, I find it satisfactory to employ a skeleton rack of the above type capable of accommodating four different weights, one weighing 50 carats, two others weighing 20 carats each, and the fourth one weighing 10 carats. When all four of these weights are suspended from the rack at the same time the total load will be 100 carats, but by appropriate selection and combination of the weights which are suspended from the rack it is possible to obtain eleven different loads varying from 0 to 100 in steps of 10 carats each. In this particular jeweler's balance I also employ a conventional type of notched beam with a rolling poise and a chain type of counterpoise, making it possible to obtain vernier weight calibrations in a convenient manner, but it will be evident as the description proceeds that any one or all such supplementary weighing means may be eliminated and all weighing operations performed solely by my novel rack and weight mechanism which is adapted to provide for any number of different weight combinations.

Another important feature of my invention resides in the provision of means for coordinating the operation of the above described weight lifting mechanism with the operation of the bridge or cradle which serves to lift the pivoted beam and pan supports off their respective knife edge bearings when the weights and materials are being deposited on or removed from the balance. By so coordinating the operation of these mechanisms I make it possible to move the weights on and off the skeleton rack only when the beam and pan supports are off their bearings and in a position of rest, which prevents jarring of the delicate mechanisms and furthermore expedites the weighing operation.

These and other features and modifications of the invention will be described in detail in connection with the accompanying drawings, in which:

Fig. 2 is a vertical sectional view through the weight-lifting mechanism, taken on line 2—2 of Fig. 1;

Fig. 3 is a similar view illustrating the operation of the weight lifting means;

Fig. 4 is a plan view of the hand controls for operating the weight and cradle lifting mechanisms, being taken on line 4—4 of Fig. 5;

Fig. 5 is a vertical section through these control mechanisms on line 5—5 of Fig. 4;

Fig. 6 is a horizontal section taken on line 6—6 of Fig. 2;

Fig. 7 is a horizontal section taken on line 7—7 of Fig. 3;

Fig. 8 is a diagram illustrating the operation of the weight lifting mechanism to give various combinations of weights;

Figure 1:
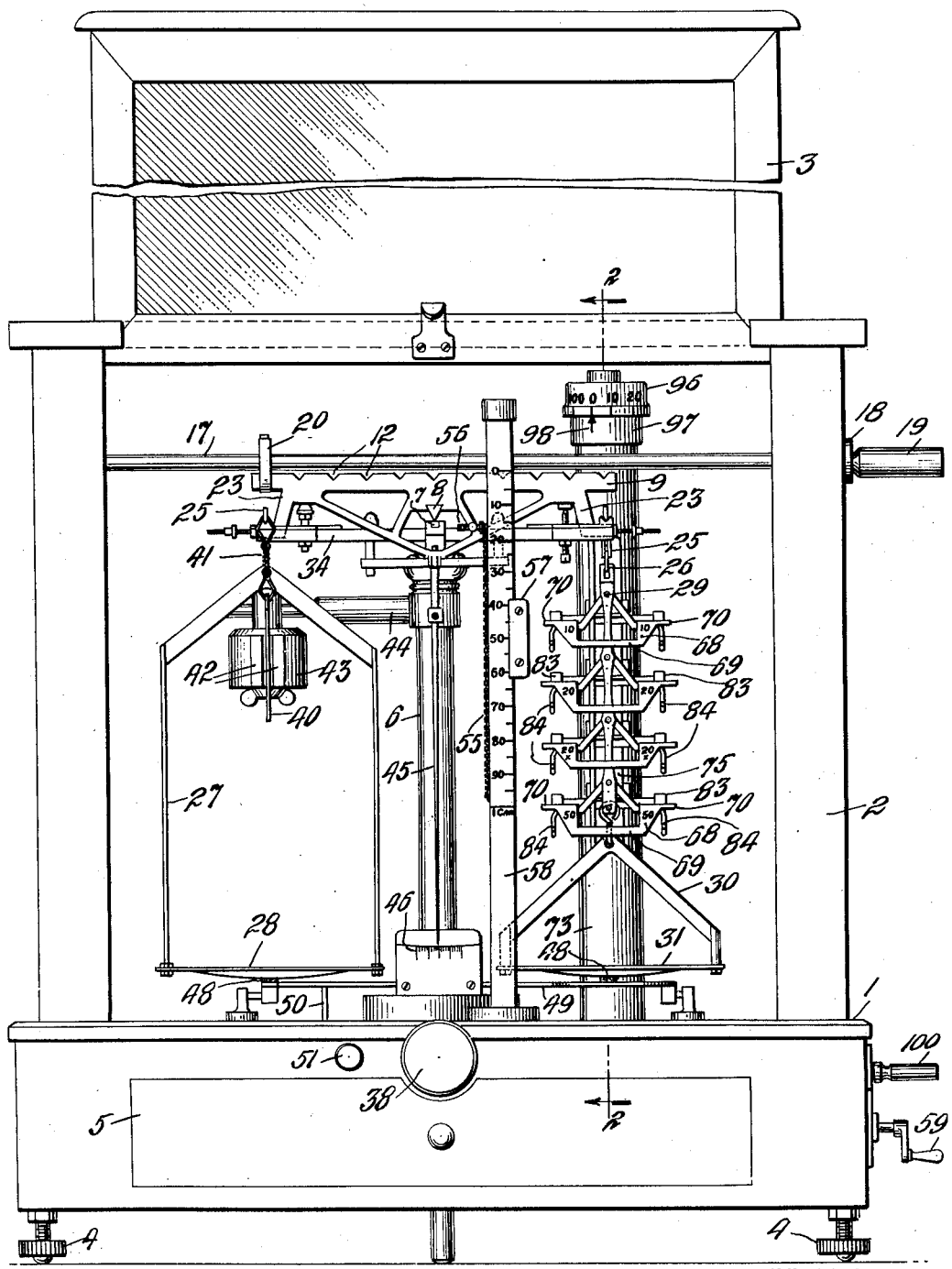
Fig. 1 is a front elevation of a jeweler's balance embodying my invention.

Figs. 9 to 12 inclusive are detail views of rotatable elements which control the operation of the weight lifters; and Fig. 13 is a front view of the rack or hanger for supporting the removable weights.

The balance shown in the drawings has a base 1 supporting case 2 which encloses the device and is provided with transparent windows and sliding front 3 which is shown in raised position. The device rests on conventional feet including leveling screws 4, and the base may be provided with a drawer 5 for storing the weights, etc., as is usual in balances of this type.

The base supports a standard 6 having a knife edge bearing 7 carrying the central knife edge 8 of beam 9 as shown in Fig. 1. The beam 9 has a longitudinal slot 10 (Figs. 2 and 3) and longitudinal notches 12 graduated from "1" to "10", the notches in this particular instance representing from one to ten carats. A movable poise 13 having spindles 14 is adapted to fit in these notches as shown in Figs. 1 to 3.

An arm 15 is secured to the standard 6 in the well-known manner, and has a ball 16 at its free end. A rotatable and horizontally movable hollow shaft 17 partially encloses the ball 16 and is supported and guided thereby in its longitudinal movement. The shaft 17 passes through a bearing 18 in case 2 and has a knob or finger piece 19 outside the case for controlling the movement of the shaft. Within the case, shaft 17 carries an arm 20 having a pair of opposed V-shaped grips 21 which are adapted to receive the spindles 14 of poise 13 for the purpose of lifting the poise and carrying it from one of the notches 12 to another when the shaft 17 is actuated from outside the case.

The beam 9 has depending arms 23 at its outer ends carrying suitable knife edges 24 on which rest the knife edge bearings of yoke frames 25. These yoke frames carry pivoted hooks 26, one of which supports the bow 27 of conventional weighing pan 28 while the other supports the skeleton weight rack or hanger 29 from the lower end of which is suspended the short bow 30 of the second weight pan 31 as shown in Figs. 1 to 3. The standard 6 also supports the usual bridge or cradle 34 which is raised and lowered by vertical plunger 35 within the standard 6 for the purpose of lifting beam 9 and yoke frames 25 off their respective knife edge bearings when the weights and materials are being placed in and removed from pans 28 and 31 or when the balance is not in use. Plunger 35 is actuated by a cam 36 carried by rotatable shaft 37 which extends through the bottom of the case and is rotated by a knob 38 which is conveniently located at the front of the balance as shown in Figs. 1 to 3.

The balance shown here for purposes of illustration is also provided with a magnetic damper consisting of an aluminum or other non-magnetic damping plate 40 which is suspended by light chains 41 from the yoke frame 25 at the left-hand end of the beam as viewed in Fig. 1 and is adapted to move up and down between the closely spaced poles 42 of a permanent magnet 43 which is carried by a bracket 44 mounted on a standard 6 as set forth in my Patent #1,900,641 of March 7, 1933. In this manner swinging movement of the pan bows 27 and 30 and associated parts are isolated from the damping plate 40 and the damping plate is prevented from striking against the poles of the magnet which would seriously affect the sensitivity and accuracy of the balance. The eddy currents set up by moving the plate 40 through the magnetic field dampen the motion of the beam and bring the balance to rest in a few seconds.

The beam 9 carries the usual pointer 45 which moves over a scale 46 at the front of the balance as shown in Fig. 1. The balance may also be provided with the usual pan rests 48 which are adapted to contact with the bottoms of pans 28 and 31 to arrest their motion, these rests being mounted on a pivoted bar 49 the position of which is controlled by a finger 50 and an associated plunger having an actuating knob 51 located at the front of the balance in any suitable manner as indicated in Fig. 1.

In the embodiment illustrated, the balance is also provided with a conventional type of weighing chain 55 one end of which is secured to an adjustable screw 56 on beam 9 and the other end of which is secured to a slide 57 carried by a vertical guide post 58 as shown in Fig. 1. The guide post 58 is calibrated in any suitable manner, for example in tenths of a carat ranging from zero to one carat, the vertical movement of slide 57 serving to transfer more or less of the weight of chain 55 from beam 9 to post 58, or vice versa, as indicated by the calibrations on the post 58. According to the usual practice the vertical movement of slide 57 is controlled by a spirally threaded rod which is rotatably mounted in the guide post 58 and is operated by a crank or handle 59 conveniently located at the lower end of the balance case as shown in Fig. 1.

The construction of the skeleton weight rack or hanger 29 and associated parts forming the subject matter of my invention is shown in detail in Figs. 2 to 13 of the drawings. This rack consists of a light two-sided bar having an opening 61 at its upper end for suspending same from the hook 26 of one of the yoke frames 25, and a pin 62 at its lower end adapted to support a hook 63 from which the short bow 30 of weighing pan 31 is suspended as best shown in Figs. 2, 3 and 13. The rack 29 carries a plurality of equally spaced weight supporting members 64 which are confined between the two parallel sides of the rack and are pivoted thereto by pins or rivets 65 as shown in Figs 2, 3 and 13. The weight supporting members 64 are somewhat similar in shape and appearance to small coat hangers although their outer ends are preferably straightened out as indicated at 66 in Fig. 13 so that they are parallel to the base of the balance and thereby afford a better support for their associated weights as hereinafter described. It is to be understood that rack 29 and its associated parts including weighing pan 31 are of such weight as to bring the balance to a state of equilibrium under a condition of no load, that is, in the absence of all weights and substances to be weighed and with the poise 13 and chain slide 57 in their zero positions.

The weights associated with the various weight supporting members 64 are shown in Figs. 1, 2, 3 and 6 as consisting of individual metal stampings 68 each having inverted V-shaped end portions which are spaced apart and joined at one limb of the V by an integral bar 69 and having outwardly extending projections 70 at the apexes of the V-shaped portions as best shown in Figs. 1 and 6. In the embodiment illustrated the skeleton weight rack 29 has four weight supporting members 64 and I therefore provide four weights of the type described, one weight being allotted to each of the supporting members 64. In this particular balance the calibrations are in terms of carats, and I find it convenient to employ one weight of 10 carats, two weights of 20 carats each, and a fourth weight of 50 carats, as illustrated in Fig. 1, although it will be evident that any other number, value or arrangement of weights may be employed as desired.

I shall now describe the weight lifting mechanism by means of which the above weights may be lifted off or deposited on the supports 64 of rack 29 individually or in any desired combination. This mechanism includes a tubular supporting standard or column 73 having a vertical opening 74 at the front adjacent and in alignment with the rack 29 which is suspended from the right-hand end of the beam 9 as viewed in Fig. 1 of the drawings. A plate 75 is secured to the front of column 73 and is provided with a vertical opening 76 in alignment with the opening 74 of the column. The weight lifting arms 77, which are four in number, are forked at the back to provide a central prong or extension 78 which extends through vertical openings 74 and 76 into the interior of column 73, and spaced side extensions 79 and 80 which straddle the sides of plate 75, these extensions 78, 79 and 80 of each arm being pivotally connected to the plate 75 pin pins 81 as shown in Figs. 2, 3 and 6. Outwardly of the column 73 the arms 77 are provided with extensions 83 carrying spaced fingers 84 which are so positioned as to extend directly underneath the projections 70 of the respective weights 68 whereby to lift said weights off their respective supports 64 when the lifting arms 77 are tilted as hereinafter described. In order to limit the upward and downward tilting movement of the weight lifting arms 77 and associated fingers 84 I provide a vertical bar 85 which is secured to one side of the plate 75 and contains a plurality of spaced uniform openings 86 through which the weight lifting arms 77 pass. The depth of these openings 86 determines the extent of the up and down movement of arms 77 and their associated fingers 84, the arms striking against the upper or lower edges of said openings when the limit of movement is reached. The depth and spacing of these openings 86 is such that the arms 77 and fingers 84 will rest clear of the rack 29 and weights 68 when in the lower tilted position, whereas the fingers 84 will support and raise the weights 68 clear of the rack when in the upper tilted position as hereinafter described.

The mechanism for operating the weight lifting arms 77 includes a rotatable and vertically movable rod 89 which is mounted within the upright column 73 as shown in Figs. 2 and 3 of the drawings. Secured to rod 89 within column 73 are a plurality of flat faced segments 90, 91, 92 and 93 which in this instance are integrally connected to a hollow hub 94 surrounding rod 89 and keyed thereto at 95. The segments 90, 91, 92 and 93 are spaced apart a distance corresponding to the spacing of the various central prongs or extensions 78 of the respective weight lifting arms 77, each segment being directly above the associated extension 78 of its allotted arm 77 as shown in Figs. 2 and 3. These segments 90, 91, etc., are in the form of segmentary circles slightly smaller in diameter than the inside diameter of column 73, and each segment has its flat face cut out according to a predetermined pattern in such a way that the extensions 78 of the weight lifting arms 77 associated with the respective segments are either aligned with and thereby fit into the cut-out portions of the segments or else strike against the lower flat faces of said segments, according to the angular position into which the segments are rotated by the rod 89.

At its upper end the rotatable and vertically movable rod 89 carries a cap or cover 96 which telescopes with an annular flange 97 secured to the upper end of column 73 as shown in Figs. 1 to 3. The cap 96 constitutes a dial having its circumference graduated in tenths, the graduations ranging from 0 to 100 as indicated by the diagram of Fig. 8, these calibrations corresponding to the number of possible combinations in which the weights 68 may be suspended from the rack or hanger 29 described above. The top flange 97 of column 73 contains a marker or indicator 98 cooperating with the calibrations of the dial 96 as shown in Fig. 1. In order that the weight suspended from hanger 29 may correspond exactly with the various calibrations of dial 96 cooperating at any time with the indicator 98 of flange 97, it is necessary that the segments 90, 91, etc. on rod 89 be cut out in such a way that they will cause the weight lifting arms 77 to deposit the desired weight or combinations of weights on rack 29 while lifting and holding all the other weights off the rack and out of range of the moving rack and associated parts during the weighing operation.

Fig. 2 shows rod 89 and associated segments 90, 91, etc. in elevated position, and it will be noted that in this elevated position all of the weight lifting arms 77 have descended of their own weight upon their pivots 81 until said arms 77 strike against the lower edges of the openings 86 in bar 85 at the front of column 73 and the weight lifting fingers 84 of the arms 77 are in their lower tilted position out of contact with the projections 70 of weights 68 so that the weights 68 are all suspended from the hanger 29 as previously described. Assuming now that it is desired to suspend only one weight from the hanger 29, for example the lowermost weight 68 which weighs fifty carats, it is necessary that the rod 89, while in the elevated position shown in Fig. 2, be rotated by means hereinafter described until the calibration "50" on the dial 96 arrives in alignment with the indicator 98 on flange 97. Fig. 2 shows the rod 89 rotated to this exact position, and, in this position, it will be noted that the lowermost segment 93 on rod 89 clears the extension 78 of its associated weight lifting arm 77, whereas all the other segments 90, 91 and 92 are so disposed that some solid part of each of these segments lies directly above the extensions 78 of their respective weight lifting arms 77 and will therefore strike against and move these arms upwardly about their pivots when the rod 89 and associated segments are lowered within the column 73. With the parts in the position shown in Fig. 2 the rod 89 is next lowered in a manner hereinafter described, thereby bringing the elements to the position shown in Fig. 3, and in this position it will be noted that the solid portions of the segments 90, 91 and 92 strike against the extensions 78 of their respective weight lifting arms 77 and thereby hold these arms in the upper tilted position with the associated fingers 84 supporting their respective weights 68 off the rack 29 and out of the path of movement of said rack during the subsequent weighing operation. However, the lowermost segment 93 of the series is now in such an angular position that it is out of contact with the extension 78 of its associated weight lifting arm 77 and this arm 77 will therefore remain in its downwardly tilted position clear of the rack 29, leaving its associated weight 68 suspended on the rack as previously described.

The relative positions of the various segments 90, 91, 92 and 93 at different positions of the dial 96 are illustrated graphically in the diagram of Fig. 8. The top segment 90 is divided into five spaced parts, and these parts have therefore been numbered 90a, 90b, 90c, 90d and 90e in Fig. 8. The second segment 91 is divided into two spaced parts which are identified as 91a and 91b in Fig. 8, while the two spaced parts of segment 92 are identified as 92a and 92b, and the single segment 93 is shown at the bottom of the series in Fig. 8. When the dial 96 is set at zero there are no weights suspended from the rack 29, and this condition is graphically illustrated in Fig. 8 by the fact that all of the segments 90a, 91a, 92a and 93 engage the extensions 78 of their respective weight lifting arms 77 which in Fig. 8 are represented in the form of either hollow or solid circles according to whether said arms are engaged or released. Thus, in Fig. 8 all the circles in alignment with the zero reading of the dial are hollow circles, and the zero positions of the various segments are indicated by the arrows opposite the "o" points in Figs. 9 to 12 inclusive. Now, when the dial 96 is moved to the "10" position, only the uppermost segment 90 of the series will release its associated weight lifting arm 77 because at this particular reading of the dial the space between the solid portions 90a and 90b of segment 90 will be in alignment with the extension 78 of this particular arm 77 as indicated by the solid circle opposite the point "10" in Fig. 8; whereas all the other segments 91a, 92a and 93 will still hold their respective weight lifting arms 77 in elevated position with their various weights off the rack 29; so that only the ten carat weight associated with segment 90 will rest on the rack. When the dial 96 is turned to the "20" position it is necessary to have only one twenty carat weight 68 suspended from the rack, and this condition is provided for by the circumstance that the three segments 90b, 92a and 93 hold their respective weight lifting arms 77 in elevated position with their weights 68 off the rack while the segment 91 assumes such a position that the extension 78 of its associated weight lifting arm 77 rests in the cut-out portion between the solid portions 91a and 91b of this segment with the result that the weight lifting arm 77 allotted to this segment is allowed to descend and deposit its twenty-carat weight 68 on the rack 29. Fig. 8 also illustrated all other possible positions of the segments 90, 91, 92 and 93 corresponding to various combinations of weights, culminating in the final position at the righthand side of Fig. 8 representing 100 carats, in which position all of the segments are out of contact with the extensions 78 of their respective weight lifting arms 77 so that all four of said arms 77 are in the lower tilted position in which all four weights, totaling 100 carats, are suspended from the rack 29.

Rotation of the rod 89 in column 73 is controlled by a knob or finger piece 100 carried by shaft 101 which is journaled in the side of the balance case 2 and in a bracket 102 which depends from the base 1 as shown in Figs. 4 and 5. Shaft 101 carries a worm 103 which meshes with a worm wheel 104 keyed to a hollow tube or bushing 105, this bushing 105 passing upwardly through a bearing 106 in base 1 into the bottom of column 73 and loosely surrounding rod 89 as shown in Figs. 2 and 3. At its upper end within column 73 the bushing 105 carries a pair of diametrically opposite fins 108 which, of course, rotate with the bushing 105 and worm wheel 104. The vertical rod 89 carries a disc 109 containing two diametrically opposite openings 110 which fit over and engage the fins 108 of bushing 105 as shown in Figs. 2, 3 and 7. It will thus be evident that when the control knob 100 is rotated, it causes rotation of shaft 101, worm 103, worm wheel 104, bushing 105, fins 108, disc 109 and vertical rod 89 within column 73. Furthermore, the fins 108 are of such height that they will remain in engagement with the slots 110 of disc 109 regardless of the vertical position of rod 89 which is adapted to be moved up and down in column 73 in the manner described below.

The rod 89 extends through the bottom of column 73 and base 1 of the balance and has a spool-shaped member 112 on its lower end as shown in Figs. 2, 3 and 5. A lever 113 is pivoted to the under side of the base 1 at 114 and on one side of its pivot 114 this lever is flattened and formed to provide a fork 115 which straddles and engages the spool 112 on rod 89. The opposite side of lever 113 extends beneath the rotatable shaft 37 which controls the plunger 35 for raising and lowering the cradle 34 of the balance as described above, and this portion of lever 113 is shaped in the form of a cam surface 116 which engages a roller 117 carried by cam 118 which is mounted on shaft 37 as shown in Figs. 4 and 5. Hence, by moving lever 113 about its pivot 114 the vertical rod 89 is caused to move up and down in column 73. The cams 36 and 118 are so arranged on shaft 37 that, when cam 36 is in the raised position of Fig. 5 raising plunger 35 and thereby raising the cradle 34 which lifts the beam 9 and yoke frames 25 off their respective knife edge bearings, the cam 118 will assume the depending position shown in Fig. 5 with the forked end 115 of lever 113 holding rod 89 and its associated elements in the elevated position shown in Fig. 2. A compression spring 120 is preferably provided as shown in Fig. 4 to hold the shaft 37 under tension so as to prevent accidental rotation of the shaft and cams.

From the foregoing description it will be seen that the operation of knob 38 at the front of the balance controls the movement of the cradle 34 as well as the vertical movement of rod 89 and its associated segments 90, 91, 92 and 93 controlling the weight lifting arms 77 of the balance. When knob 38 is rotated in one direction the cradle lifting plunger 35 and the rod 89 are both elevated which is the condition illustrated in Figs. 2 and 5 of the drawings. This is the normal or "rest" position of the balance and it is in this position that all adjustments are made, the knob 51 at the front of the balance also being operated to cause the pan rests 48 to engage the pans 28 so as to arrest their motion at this time. With the parts in this position the substance to be weighed is placed in pan 28 and any desired standard weights are placed in pan 31, after which the sliding front 3 of the case 2 is closed to exclude air currents. The operator then makes the desired weight adjustments by actuating the various control devices 19, 59 and 100 from outside the balance, using the various scales and dials to determine the proper adjustments. Rotation of knob 100 causes the rod 89 to rotate the various segments 90, 91, 92 and 93 in the manner described above, so that, when knob 38 is next actuated to lower the cradle 34 and rod 89, the selected weight or weights 68 will be suspended from the rack 29 and the beam 9 and yoke frames 25 will be returned to their knife edges as previously described.

It is to be understood that the balance described above and shown in the drawings has been selected solely for the purpose of illustrating a representative example of my invention and that various changes may be made in the details of construction and method of operation herein shown and described without departing from the scope and spirit of the invention as defined in the appended claims.

The invention claimed is:

1. A balance comprising a pivoted beam, a weight supporting frame suspended from said beam, a plurality of spaced weight supporting members pivoted on said frame and having weight supporting extensions on both sides of said pivots, a plurality of weights having V-shaped end portions adapted to rest on the extension of said weight supporting members and means rigidly connecting the end portions of said weights outwardly of their apexes, a plurality of weight lifting arms mounted on said balance having means for lifting said weights on and off said weight supporting members, and means for selectively actuating said arms to control the disposition of said weights.

2. A balance comprising a standard, a beam having a knife edge pivoted on said standard, a movable cradle for lifting said beam on and off its pivot, a vertical weight supporting rack suspended from said beam, a plurality of vertically spaced weight supporting members carried by said rack, a plurality of vertically tiltable weight lifting arms pivotally mounted on said balance having means for lifting weights on and off said weight supporting members according to the tilted positions of said arms, control means for operating said cradle to lift said beam on and off its pivot, and means operated by said control means for selectively tilting said arms about their pivots to control the disposition of said weights.

3. A balance comprising a standard, a beam having a knife edge pivoted on said standard, a movable cradle for lifting said beam on and off its pivot, a vertical weight supporting rack suspended from said beam, a plurality of vertically spaced weight supporting members carried by said rack, a plurality of vertically tiltable weight lifting arms pivotally mounted on said balance having means for lifting weights on and off said weight supporting members according to the tilted positions of said arms, individual control members for said weight lifting arms movable into and out of position to tilt said arms, actuating means for said cradle to lift said beam on and off its pivot, and means operated by said cradle actuating means to operate said control members in a direction to tilt said weight lifting arms about their pivots to control the disposition of said weights.

4. A balance comprising a pivoted beam, a weight supporting rack suspended from said beam, a plurality of vertically spaced weight supporting members carried by said rack, a plurality of vertically tiltable weight lifting arms pivotally mounted on said balance having means for lifting weights on and off said weight supporting members according to the tilted positions of said arms, a plurality of rotatable segments mounted on said balance in position to engage said weight lifting arms and hold them in elevated position holding their weights off the weight supporting members of said rack, each of said segments being cut out according to a predetermined individual pattern to permit said weight lifting arms to enter the cut-out portions of said segments and thereby descend on their pivots and deposit their respective weights on the associated weight supporting members of said rack in certain rotative positions of said segments, and means for actuating said segments to control the positions of said weight lifting arms.

5. A balance comprising a pivoted beam, a weight supporting rack pivotally suspended from said beam, a plurality of vertically spaced weight supporting members carried by said rack, a rotatable and vertically movable rod carried by said balance adjacent said rack, a plurality of vertically tiltable weight lifting arms pivotally mounted on said balance adjacent said rod having means for lifting weights on and off said weight supporting members according to the tilted positions of said arms, a plurality of segments carried by said rod in position to engage said weight lifting arms and hold them in elevated position holding their weights off the weight supporting members of said rack, each of said segments being cut out according to a predetermined individual pattern to permit said weight lifting arms to enter the cut-out portions of said segments and thereby descend on their pivots and deposit their respective weights on the associated weight supporting members of said rack in certain rotative positions of said rod, means for rotating said rod to vary the position of said segments with respect to said arms, and means for raising and lowering said rod to actuate said arms in accordance with the positions of said segments.

6. A balance comprising a standard, a beam having a knife edge pivoted on said standard, a movable cradle for lifting said beam on and off its pivot, means for actuating said cradle, a vertical weight supporting rack pivotally suspended from said beam, a plurality of vertically spaced weight supporting members carried by said rack, a rotatable and vertically movable rod carried by said balance adjacent said rack, a plurality of vertically tiltable weight lifting arms pivotally mounted on said balance adjacent said rod having means for lifting weights on and off said weight supporting members according to the tilted positions of said arms, a plurality of segments carried by said rod in position to engage said weight lifting arms and hold them in elevated position holding their weights off the weight supporting members of said rack, each of said segments being cut out according to a predetermined individual pattern to permit said weight lifting arms to enter the cut-out portions of said segments and thereby descend on their pivots and deposit their respective weights on the associated weight supporting members of said rack in certain rotative positions of said rod, means for rotating said rod to vary the position of said segments with respect to said arms, and means operated by said cradle actuating means for raising and lowering said rod simultaneously with said beam to actuate said arms in accordance with the positions of said segments.

7. A balance comprising a pivoted beam, a weight supporting rack pivotally suspended from said beam, a plurality of weight supporting members pivoted on said rack in spaced vertical alignment, a rotatable and vertically movable rod carried by said balance adjacent said rack, a plurality of vertically tiltable weight lifting arms pivotally mounted on said balance adjacent said rod in spaced vertical alignment corresponding to the spacing of said weight supporting members and having means for lifting weights on and off said weight supporting members according to the tilted positions of said arms, a plurality of segments carried by said rod in position to engage said weight lifting arms and hold them in elevated position with their weights off the weight supporting members of said rack, each of said segments being cut out according to a predetermined individual pattern to permit said weight lifting arms to enter the cut-out portions of said segments and thereby descend on their pivots and deposit their respective weights on the associated weight supporting members of said rack in certain rotative positions of said rod, means for rotating said rod to vary the position of said segments with respect to said arms, and means for raising and lowering said rod to actuate said arms in accordance with the positions of said segments.

8. A balance comprising a pivoted beam, a vertical weight supporting rack pivotally suspended from said beam, a plurality of weight supporting members pivoted on said rack in spaced vertical alignment, a tubular vertical column carried by said balance adjacent said rack, a rotatable and vertically movable rod mounted in said column, a plurality of weight lifting arms pivoted on said column in spaced vertical alignment corresponding to the spacing of said weight supporting members, said weight lifting arms having extensions on one side of their pivots projecting into said column and fingers on the other side of said pivots positioned to lift weights on and off said weight supporting members according to the tilted positions of said arms, a plurality of segments carried by said rod in spaced vertical alignment corresponding to the spacing of said arms and positioned above the extensions of said arms within said column, each of said segments having its face cut out according to a predetermined individual pattern whereby the extensions of said arms will enter the cut-out portions of said segments and permit said arms to descend on their pivots and deposit their respective weights on the associated weight supporting members of said rack in certain rotative positions of said rod, and will strike against the undersides of said segments to prevent said arms from descending on their pivots and thereby cause them to lift their respective weights off the associated weight supporting members of said rack in other rotative positions of said rod, means for rotating said rod to vary the position of said segments with respect to the extensions of said arms, and means for raising and lowering said rod to actuate said arms in accordance with the positions of the respective segments.

9. A balance comprising a pivoted beam, a vertical weight supporting rack pivotally suspended from one end of said beam, a plurality of weight supporting members pivoted on said rack in spaced vertical alignment, a tubular vertical column carried by said balance adjacent said rack, a rotatable and vertically movable rod mounted in said column, a plurality of weight lifting arms pivoted on said column in spaced vertical alignment corresponding to the spacing of said weight supporting members, said weight lifting arms having extensions on one side of their pivots projecting into said column and fingers on the other side of said pivots positioned to lift weights on and off said weight supporting members according to the tilted positions of said arms, a plurality of flat faced segments carried by said rod in spaced vertical alignment corresponding to the spacing of said arms and positioned above the extensions of said arms within said column, each of said segments having its face cut out according to a predetermined individual pattern whereby the extensions of said arms will enter the cut-out portions of said segments and permit said arms to descend on their pivots and deposit their respective weights on the associated weight supporting members of said rack in certain rotative positions of said rod and will strike against the undersides of said segments to prevent said arms from descending on their pivots and thereby cause them to lift their respective weights off the associated weight supporting members of said rack in other rotative positions of said rod, means for rotating said rod to vary the position of said segments with respect to the extensions of said arms, means for raising and lowering said rod to actuate said arms in accordance with the positions of the respective segments, a dial carried by said rod, and an indicator on said column cooperating with said dial to indicate the total value of the weights carried by the weight supporting members of said rack in various rotative positions of said rod and dial.

JOHN GATTONI.